Sept. 16, 1969   F. E. BENNER, JR., ETAL   3,467,498
METHOD FOR UNIFORM GAS DISTRIBUTION IN PROCESS
FOR PRODUCING PIGMENTARY METAL OXIDE
Filed April 20, 1964
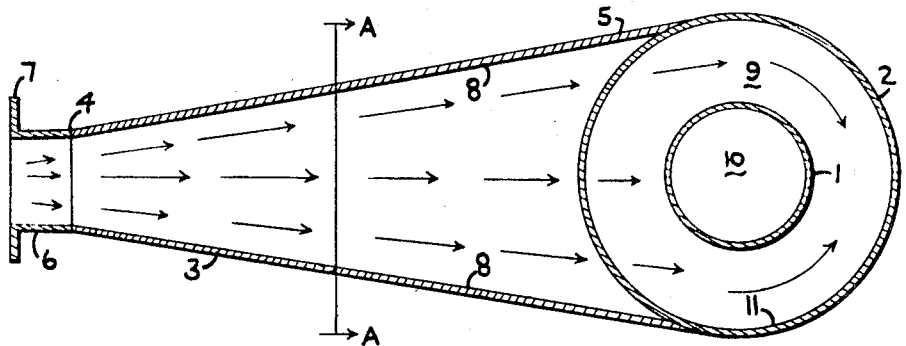
FIG. 1
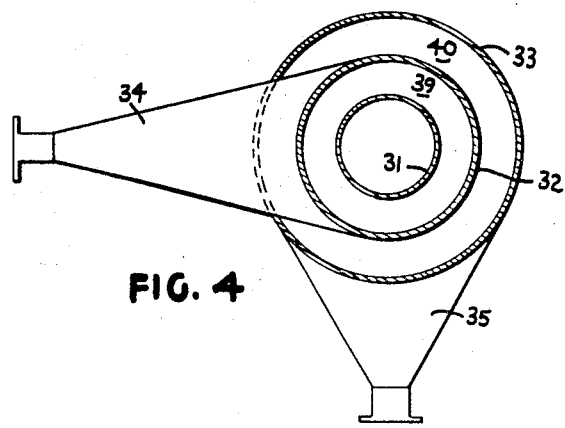
FIG. 2
FIG. 4
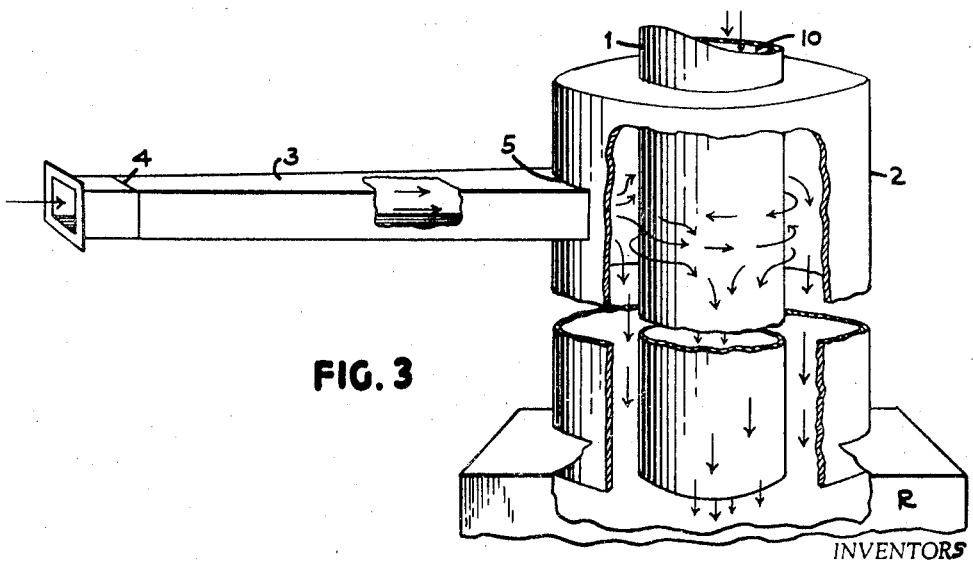
FIG. 3
INVENTORS
FLOYD E. BENNER JR.
BY CLIFFORD E. LOEHR
Chisholm and Spencer
ATTORNEYS they a United States Patent Office 3,467,498
Patented Sept. 16, 1969

3,467,498
METHOD FOR UNIFORM GAS DISTRIBUTION IN PROCESS FOR PRODUCING PIGMENTARY METAL OXIDE
Floyd E. Benner, Jr., Wadsworth, and Clifford E. Loehr, Akron, Ohio, assignors to PPG Industries, Inc., a corporation of Pennsylvania
Filed Apr. 20, 1964, Ser. No. 360,937
Int. Cl. C01b 13/14; C01g 23/04; B01f 3/02
U.S. Cl. 23—202
17 Claims

ABSTRACT OF THE DISCLOSURE

The production of pigmentary metal oxides, e.g., titanium dioxide, by vapor phase oxidation of the corresponding metal halides, e.g., titanium tetrachloride, is described. Method and apparatus for providing effective mixing of reactant gases is discussed and a particular method for delivering reactant gases to the mixing zone in a uniform manner is described.

---

This invention relates to novel apparatus and process for the distribution of a gas or gases. More specifically, this invention relates to novel apparatus and process for the distribution of a gas or gases in the production of metal oxides, particularly pigmentary titanium dioxide, by a vapor phase oxidation process; that is the reaction of a metal halide in the vapor phase with an oxygenating or oxygen-containing gas.

In the production of titanium dioxide by the vapor phase oxidation of titanium tetrahalide either in the presence or absence of a fluidized bed, the titanium tetrahalide is oxidized by reaction in the vapor phase state with oxygen or an oxygen-containing gas in a relatively confined area maintained at a temperature above 700° C. in a range of about 800° C. to 1200° C., preferably not higher than 1600° C.

An important aspect of efficiently producing or making pigmentary titanium dioxide is the mixing of vaporous or gaseous streams, particularly reactants. In the various vapor phase oxidation processes, it is especially useful and advantageous to introduce the reactant gas streams of titanium tetrahalide and oxygen-containing gas separately into the reaction zone by means of a series of concentric tubes or annuli. Reference is made to FIGURE II of U.S. Letters Patent 2,791,490 issued to Willcox and U.S. Letters Patent 2,968,529 issued to Wilson.

In more sophisticated process, such as disclosed in U.S. Letters Patent 3,068,113 issued to Strain et al. and U.S. Letters Patent 3,069,281 issued to Wilson, additional gas streams, e.g., inert gases, are separately introduced into the reaction zone via additional concentric tubes. In such arrangements, the number of concentric tubes employed will generally be a function of the number of different gas streams to be introduced into the reaction zone, although it may sometimes be desirable to introduce several gases through a single tube.

Since heat is frequently added to the vaporous reactants or other gases within these tubes, e.g., by reacting CO with $O_2$, the concentric arrangement of tubes may be commonly called a burner and the tubes referred to as burner tubes. Hereinafter, the term "gas introduction tubes" will be employed so as not to limit the invention solely to burner arrangements; that is the present invention is intended to be employed in conjunction with any arrangement of concentric flow path particularly used in the production of pigmentary metal oxide.

In accordance with this invention, the various gas streams are emitted from the various annuli or flow paths formed by concentrically arranged tubes in a predictable uniform, concentric flow pattern and in a direction of flow parallel to the axis of the center of the arrangement or assembly of the concentric gas introduction tubes. By so uniformly and axially emitting the gases from the annuli or concentric flow paths, it is possible to operate a pigmentary $TiO_2$ vapor phase oxidation process continuously for long periods of time without oxide scale or growth forming on the lips of the gas introduction tubes extending into the reaction chamber.

However, when the process is not operated in accordance with this invention, e.g., when one or more of the gas streams is emitted at a angle, then oxide scale or growth quickly forms on the lips of the gas introduction tubes eventually causing plugging and shutdown. Furthermore, during the growth buildup, part of the scale will break off in the form of coarse, nonuniform particles which hinder the formation and recovery of a pigmentary metal oxide. Likewise, the growth buildup diverts the flow of the gases and hinders mixing to such an extent that the formation of pigmentary metal oxide is further prevented.

In the practice of this invention, such scale buildup or burner growth is prevented and highly-dispersed pigmentary metal oxide, particularly titanium dioxide, of small, uniform particle size and having improved tinting strength can be produced by a continuous vapor phase oxidation process.

In the present invention, the inert and/or reactant gas stream is introduced to the annulus or annuli in a manner such that the gas is distributed over the entire cross-sectional area of the annulus and is emitted from the burner into the reatcion zone in a predictable uniformly concentric flow pattern with a direction of flow parallel to the axis of the burner assembly; that is, the present technique makes possible the controllably metering and mixing of the various gas streams introduced into the reactor in a predictable, useful, and advantageous manner.

More particularly, the gas stream is introduced to the annulus by means of a wide angle distribution tube which is elongated and connected substantially transverse to the burner assembly, the end of the tube connected to the burner assembly being substantially wider and greater in mean diameter or width and cross-sectional area than the other end. Thus as the gas stream flows through the tube, the gas increases in volume, increases in pressure, and decreases in linear velocity.

The invention will be better understood by reference to the drawing and the figures thereon.

In the drawing:

FIGURE 1 is a cross-section through a plain view of a preferred embodiment of apparatus to be used in the present process invention.

FIGURE 2 is a cross section through A—A of FIGURE 1.

FIGURE 3 is a three-dimensional view with cut-aways of the embodiment of FIGURE 1.

FIGURE 4 is a plan view showing a double embodiment of FIGURE 1.

More specifically, FIGURE 1 discloses wide-angle gas distribution apparatus 3 employed in conjunction with two concentric gas introduction tubes, 1 and 2.

The wide-angle apparatus 3 as shown in FIGURE 1 comprises an elongated tube or pipe which has a more narrow width and cross-sectional area at one end 4 thereof in relation to opposite end 5, the cross-sectional area and mean diameter uniformly increasing from end 4 to end 5. The narrow end 4 may be attached to any suitable gas supply means by appropriate connecting means such as flange 7 and coupling 6.

The cross section of the apparatus 3 is shown in FIGURE 2 as being rectangular. However, other cross-sectional shapes, e.g., circular, elliptical, are deemed to be within the skill of a mechanic in the art and are considered to be within the scope of this invention.

The end 5 is attached by an suitable means, e.g., welding, to the pipe 2. Although the end 5 is shown in FIGURE 1 as being attached externally of pipe or tube 2, it could just as well be attached internally. In the preferred practice of this invention, the end 5 is attached to the pipe 2 in a manner such that the internal side walls 8 are substantially tangential to the inside wall of pipe 2, such that a portion of the gas stream introduced through tube 3 to annulus 9 is substantially tangential to the inside wall of burner tube 2 and outside wall of tube 1.

Although it is preferred that the tube 3 be attached to pipe 2 at the maximum diameter, such that the maximum diameter of both is about the same, tube 3 may be attached at a point such that its maximum diameter is less than that of pipe 2 providing its maximum diameter still exceeds that of pipe 1.

In the preferred arrangement disclosed in FIGURE 1, a gas stream is introduced through coupling 6 at end 4. As the gas stream continues through the uniformly diverging passage of apparatus 3, the gas stream expands, increases in volume, increases in pressure and diverges, the linear velocity of the gas decreasing and the gas thereby distributing uniformly throughout the cross-sectional area of annulus 9 between tubes 1 and 2.

As shown in FIGURE 3, the gas stream continues in a downwardly direction into a reactor R and is emitted from the flow path or annulus 9 into the reactor in a uniformly concentric predictable flow pattern parallel to the common axis of the burner tubes 1 and 2.

Where the elongated tube connected to the annulus is of constant cross-sectional dimensions, then there is no spreading or diverging of the gas flow pattern nor a decrease in the gas velocity as the gas angularly approaches the concentric gas introduction tube assembly, and accordingly the gas stream is not uniformly and predictably distributed within the annulus but flows downwardly through the annulus on the side opposite to the side at which it originally entered the annulus. As the stream enters into the reactor, it immediately flows at an angle into adjacent gas streams thereby hindering the mixing and causing oxide growth immediately to form at the lips or exit openings of the tubes.

FIGURE 4 represents a double embodiment of the process of FIGURE 1 where three concentric gas introduction tubes 31, 32 and 33 are employed with wide-angle distribution tubes 34 and 35 being connected respectively to annuli 39 and 40.

Although it is preferred that the wide-angle gas distribution tube 3 be substantially transverse to the common axis of the concentric tubes (such as shown in FIGURE 3), it is equally possible for the tube to be connected at an angle ranging from 10° to 170°, preferably within 45° to 135°.

In the practice of this invention, the diameter of the annulus should be 1.5 to 40 times, preferably 6 to 14 times, the smallest width of the distribution tube, such that the mean diameter of the gas stream gradually expands and increases by a multiple ranging from 1.5 to 40 within a linear distance of 1 to 20 feet, such that the gas stream expands and diverges 5° to 90°, preferably 10° to 25°, along at least one axis of the distribution tube.

By diameter, it is also intended mean or average diameter or width where the distribution tube has a rectangular cross section or geometric shape other than circular.

The cross-sectional area of the gas stream within the distribution tube should increase by a multiple of about 1.5 to 1600 times within a distance of 20 feet based on the mean diameter.

Although the present process has been described and illustrated as comprising a wide-angle distribution tube which uniformly and constantly increases in cross-sectional area, it is to be understood that this may be accomplished by a series of steps; that is a constant increase in diameter and cross-sectional area is herein defined as also comprising a process wherein the gas is gradually expanded in a series of distinct steps in which case the angle of divergence and expansion is measured from the initial diameter to the final diameter.

The vaporous metal halide reactant, e.g., titanium tetrahalide, is preferably introduced into the reactor chamber at a theoretical velocity of 500 to 60,000 feet per minute calculated at 150° C. and 1 atmosphere. The oxygen-containing stream is introduced at 200 to 50,000 feet per minute calculated as pure oxygen gas at 0° C. and 1 atmosphere. The inert gas, e.g., chlorine, is introduced at 50 to 6000 feet per minute, calculated at 0° C. and 1 atmosphere.

The cross-sectional area of the gas introduction tubes and annuli is preferably circular. However, it is also possible to employ other geometric shapes and designs in conjunction with the present process, this being deemed to be within the skill of a mechanic in the art.

Likewise, the present invention may be practiced to introduce gas at an angle to the center gas introduction or burner tube, e.g., tube 10 in FIGURES 1 and 3. In practice, it is usually preferred to introduce the gas stream, e.g., oxygen, from the top of the tube assembly. However, in some instances it is necessary to introduce the gas stream at an angle in which case the present invention is valuable to prevent swirling of the gas stream; the swirling of the stream also causing poor mixing and the formation of poor quality pigmentary metal oxide.

In a further modification of the present process, additional gas or vapor may be introduced into the wide-angle distribution tube at an angle thereto. Such gas may be the same or different from that introduced at end 4.

The temperatures of the various gases introduced through the concentric tubes may range from 100° C. to 2500° C., $TiCl_4$ preferably being below 500° C. whereas the oxygen or an inert gas may be preheated by the combination of a fuel, CO, or sulfur-containing compound to temperatures in excess of 1500° C., or in excess of 2000° C. where a plasma arc is employed.

In a further embodiment of the invention, the gas is first expanded from a small diameter pipe into a larger pipe of constant diameter, the expanded gas stream having an immediate decreased velocity at which it is fed into the annulus or concentric flow path. The rate of expansion must be such that the rate of gas flow is sufficiently diminished and decreased to a point at which gas distribution is effected. The diameter of the large pipe is preferably 1.5 to 20 times that of the smaller pipe ranging from the minimum diameter to the maximum diameter, preferably the latter, of the annulus into which the gas is flowing.

The term inert gas as employed herein means any gas which is inert to the reaction of the metal halide and oxygen. Examples of such inert gases, not by way of limitation, are argon, nitrogen, helium, krypton, xenon, chlorine, carbon dioxide, or mixtures thereof. Carbon monoxide may also be introduced in place of in addition to, or mixed with an inert gas as defined hereinabove, the carbon monoxide being introduced as a means of providing heat to the reaction zone for the sustaining of the reaction; the CO reacting with the oxygen to form $CO_2$. Likewise, sulfur-containing compounds as disclosed in copending U.S. application Ser. No. 15,300, now U.S. Letters Patent 3,105,742, may be introduced through the annulus or annuli alone or mixed with a gaseous reactant or inert gas. Thus, any gaseous stream, e.g., metal halide, oxygen, inert gas, carbon monoxide, sulfur-containing compounds, natural gas or mixtures of same, may be added to the annulus or annuli of the concentric tubes by means of this inventive process.

Although this invention has been illustrated in FIGURES 1 and 4 as comprising two and three concentric burner tube arrangements, it is not to be so limited and may be used in conjunction with any number of concentric tubes and annuli. Thus, in the production of pigmentary titanium dioxide, it is possible to use as many as six or eight concentric tubes with five to seven annuli, four or more gases, and six or more streams, some of the gases being introduced in separate streams through two or more annuli.

The following are typical examples:

Example I

Using the process of FIGURE 1, 36 gram-moles per minute of oxygen at 1100° C. are continuously fed through internal tube 1 having an internal diameter of 5 inches while 32 gram-moles per minute of titanium tetrachloride at 500° C. is continuously fed into annulus 9 having a maximum internal diameter of 9 inches through the wide-angle distribution tube 3 having a length of two feet with internal diameters of 1 inch and 9 inches respectively at the ends 4 and 5.

Vaporous aluminum trichloride at 300° C. is introduced into the $TiCl_4$ stream at the rate of about 60 to 130 grams per minute before the $TiCl_4$ is introduced into annulus 9. Liquid $SiCl_4$ is also added to the $TiCl_4$ stream at the rate of about 0.18 gram-mole per minute before the introduction of the $TiCl_4$ into the annulus through distribution tube 3.

The process is operated continuously for 168 hours. A typical $TiO_2$ product sample during the run has an average tinting strength (Reynolds Scale) of 1730.

For comparison purposes, the conditions above are repeated with a standard 1½ inch Sch. 40 pipe, 2 feet in length, being substituted for the wide-angle distribution tube 3. After 30 minutes of operation, the tubes 1 and 2 plug at the reactor end thereof due to oxide growth and buildup. A typical $TiO_2$ product sample during the run has an average tinting strength (Reynolds Scale) of 1350.

Example II

By using the double embodiment of FIGURE 4, 38 gram-moles per minute of oxygen at 1150° C. is continuously fed through internal tube 31, having an internal diameter of 4 inches while 32 gram-moles per minute of titanium tetrachloride at 525° C. is continuously fed through a wide-angle distribution tube 35 having a length of 1½ feet with internal diameters of 2 inches and 12 inches respectively at the ends, the maximum diameter of the annulus 40 being 12 inches.

Chlorine at 400° C. is continuously fed at a rate of 5 to 7 gram-moles per minute into annulus 39 having a maximum diameter of 7 inches, the chlorine being introduced through wide-angle distribution tube 34 having a length of 2½ feet with internal diameters of 2 inches and 7 inches respectively at the ends.

Sixty to 130 grams per minute of vaporous aluminum trichloride at 300° C. is introduced into the $TiCl_4$ stream before it is fed into annulus 40. Liquid silicon tetrachloride at the rate of 0.19 gram-mole per minute is also added to the titanium tetrachloride before its introduction through distribution tube 35.

The process is continuously operated for 240 hours. A typical product sample during the run has an average tinting strength (Reynolds Scale) of 1770.

For comparison purposes, the conditions above are repeated without the wide-angle distribution tubes 34 and 35, the chlorine and the $TiCl_4$ both being introduced through standard 1½ inch Sch. 40 pipe as in Example I. After 2 hours of operation, the tubes 31, 32, and 33 plug at the opening into the reactor due to oxide growth and formation. A typical $TiO_2$ product sample during the run has an average tinting strength (Reynolds Scale) of 1525.

Although this invention has been described with particular reference to titanium tetrahalide, particularly titanium tetrachloride, it may be employed in the production of other pigmentary metal oxides.

The term metal as employed herein is defined as including those elements exhibiting metal-like properties, including the metalloids. Examples, not by way of limitation but by way of illustration, of pigmentary metal oxides which may be produced by the aforementioned process are the oxides of aluminum, arsenic, barium, beryllium, boron, calcium, gadolinium, germanium, hafnium, lanthanum, lithium, magnesium, iron, phosphorus, potassium, samarium, scandium, silicon, sodium, strontium, tantalum, tellurium, terbium, thulium, tin, titanium, yttrium, ytterbium, zinc, zirconium, niobium, gallium, antimony, lead and mercury.

Likewise, it is to be understood that any of the above teachings may be employed in any vapor phase oxidation process for providing a pigmentary metal oxide either in the absence or presence of a fluidized bed.

Obviously, many modifications and variations of the present invention are possible in light of the above teachings.

The above description of the invention has been given for purposes of illustration and not limitation. Various changes and modifications which fall within the spirit of the invention and scope of the appended claims will become apparent to the skilled expert in the art. Thus, it will be understood that the invention is in no way to be limited except as set forth in the following claims.

We claim:

1. In a process for producing pigmentary metal oxide by vapor phase oxidation of metal halide with oxygenating gas in a reaction zone wherein at least one gas selected from the group consisting of reactant gas and inert gas is introduced into the reaction zone through an introduction tube, the improvement which comprises preventing metal oxide plugging of said introduction tube by supplying gas to said introduction tube through a distribution tube directly connected thereto and having a substantially increasing cross-sectional area in the direction of gas flow such that said gas expands and decreases in linear velocity as it approaches and enters said introduction tube, the direction of gas flow through the distribution tube being at an angle of from 10° to 170° to the direction of flow through the introduction tube.

2. A process according to claim 1 wherein the direction of gas flow through the distribution tube is substantially perpendicular to the direction of flow through the introduction tube.

3. In a process for producing pigmentary metal oxide by vapor phase oxidation of metal halide with oxygenating gas in a reaction zone wherein at least one gas selected from the group consisting of reactant gas and inert gas is introduced into the reaction zone through an annulus formed by concentrically disposed introduction tubes, the improvement which comprises preventing metal oxide plugging of said annulus by supplying gas to said annulus through a distribution tube directly connected thereto and having a substantially increasing cross-sectional area in the direction of gas flow such that said gas expands and decreases in linear velocity as it approaches and enters said annulus, the direction of gas flow through the distribution tube being at an angle of from 45° to 135° to the direction of flow through the annulus.

4. In a process for producing pigmentary metal oxide by vapor phase oxidation of metal halide with oxygenating gas in a reaction zone wherein vaporous metal halide and oxygenating gas reactants are separately introduced into the reaction zone through annuli formed by concentrically disposed introduction tubes, the improvement which comprises preventing metal oxide plugging of said annuli by supplying at least one of said reactants to its respective annulus through a distribution tube directly connected thereto and having a substantially increasing cross-sectional area in the direction of gas flow such that said reactant expands and decreases in linear velocity as it approaches and enters the annulus, the direction of gas flow through the distribution tube being at an angle of from 45° to 135° to the direction of flow through the annulus.

5. A process according to claim 4 wherein the annulus through which said oxygenating gas flows is internally concentric to the annulus through which the vaporous metal halide flows.

6. A process according to claim 4 wherein an inert gas is introduced into the reaction zone through an annulus which is internally concentric to one reactant and externally concentric to the other reactant.

7. A process according to claim 6 wherein the inert gas is chlorine and the annulus through which chlorine flows is internally concentric to the annulus through which the vaporous metal halide flows.

8. In a process for producing pigmentary metal oxide by vapor phase oxidation of metal halide with oxygenating gas in a reaction zone wherein vaporous metal halide, oxygenating gas and insert gas are separately introduced into the reaction zone through three concentrically disposed introduction tubes, the improvement which comprises preventing metal oxide plugging of said introduction tubes by supplying oxygenating gas to the reaction zone through the most internal introduction tube, and supplying inert gas and vaporous metal halide to the middle and most external introduction tubes respectively through separate distribution tubes directly connected to their respective introduction tube and having substantially increasing cross-sectional areas in the direction of gas flow such that gas expands and decreases in linear velocity as it approaches and enters the introduction tube, the direction of gas flow through the distribution tubes being substantially perpendicular to the direction of gas flow through the introduction tubes.

9. In a proces for producing pigmentary titanium dioxide by vapor phase oxidation of titanium tetrahalide with oxygenating gas in a reaction zone wherein at least one gas selected from the group consisting of reactant gas and inert gas is introduced into the reaction zone through an introduction tube, the improvement which comprises preventing plugging of said introduction tube with titanium dioxide by supplying gas to said introduction tube through a distribution tube directly connected thereto and having a substantially increasing cross-sectional area in the direction of gas flow such that said gas expands and decreases in linear velocity as it approaches and enters said introduction tube, the direction of gas flow through the distribution tube being at an angle of from 10° to 170° to the direction of flow through the introduction tube.

10. In a process for producing pigmentary titanium dioxide by vapor phase oxidation of titanium tetrahalide with oxygenating gas in a reaction zone wherein at least one gas selected from the group consisting of reactant gas and inert gas is introduced into the reaction zone through an annulus formed by concentrically disposed introduction tubes, the improvement which comprises preventing plugging of said annulus with titanium dioxide by supplying gas to said annulus through a distribution tube directly connected thereto and having a substantially increasing cross-sectional area in the direction of gas flow such that said gas expands and decreases in linear velocity as it approaches and enters said annulus, the direction of gas flow through the distribution tube being at an angle of from 45° to 135° to the direction of flow through the annulus.

11. In a process for producing pigmentary titanium dioxide by vapor phase oxidation of titanium tetrachloride with oxygenating gas in a reaction zone wherein vaporous titanium tetrachloride and oxygenating gas reactants are separately introduced into the reaction zone through annuli formed by concentrically disposed introduction tubes, the improvement which comprises preventing plugging of said annuli with titanium dioxide by supplying at least one of said reactants to its respective annulus through a distribution tube directly connected thereto and having a substantially increasing cross-sectional area in the direction of reactant gas flow such that said reactant expands and decreases in linear velocity as it approaches and enters said annulus, the direction of reactant gas flow through the distribution tube being at an angle of from 45° to 135° to the direction of flow through the annulus.

12. A process according to claim 11 wherein the annulus through which the oxygenating gas flows is internally concentric to the annulus through which vaporous titanium tetrachloride flows.

13. A process according to claim 11 wherein an inert gas is introduced into the reaction zone through an annulus which is internally concentric to one reactant and externally concentric to the other reactant.

14. A process according to claim 13 wherein the inert gas is chlorine and the annulus through which chlorine flows is internally concentric to the annulus through which vaporous titanium tetrachloride flows.

15. In a process for producing pigmentary titanium dioxide by vapor phase oxidation of titanium tetrachloride with oxygenating gas in a reaction zone wherein vaporous titanium tetrachloride, oxygenating gas and inert gas are separately introduced into the reaction zone through three concentrically disposed introduction tubes, the improvement which comprises preventing plugging of said introduction tubes with titanium dioxide by supplying oxygenating gas to the reaction zone through the most internal introduction tube and supplying inert gas and vaporous titanium tetrachloride to the middle and most external introduction tubes respectively through separate distribution tubes directly connected to their respective introduction tube and having substantially increasing cross-sectional areas in the direction of gas flow such that gas expands and decreases in linear velocity as it approaches and enters the introduction tube, the direction of gas flow through the distribution tubes being substantially perpendicular to the direction of gas flow through the introduction tubes.

16. A method for distributing and forwarding a gas through an introduction tube for substantially uniform discharge into a reaction zone maintained for the production of pigmentary metal oxide by vapor phase oxidation of metal halide with oxygenating gas, which comprises supplying gas to said introduction tube through a distribution tube directly connected thereto and having a substantially increasing cross-sectional area in the direction of gas flow such that the gas expands and decreases in linear velocity as it approaches and enters said introduction tube, the direction of gas flow through the distribution tube being at an angle of from 10° to 170° to the direction of flow through the introduction tube.

17. A method for distributing and forwarding a gas through an annulus formed by concentrically disposed tubes for substantially uniform discharge into a reaction zone maintained for the production of pigmentary metal oxide by vapor phase oxidation of metal halide with oxygenating gas, which comprises supplying gas to said annulus through a distribution tube directly connected thereto and having a substantially increasing cross-sectional area in the direction of gas flow such that the gas expands and decreases in linear velocity as it approaches and enters the annulus, the direction of gas flow through the distribution tube being substantially perpendicular to the direction of flow through the annulus.

References Cited

UNITED STATES PATENTS

| 2,394,633 | 2/1946 | Pechukas et al. |
| 3,078,148 | 2/1963 | Belknap et al. |
| 3,120,427 | 2/1964 | Mas et al. |

FOREIGN PATENTS

| 726,250 | 3/1955 | Great Britain. |
| 876,261 | 8/1961 | Great Britain. |

EDWARD STERN, Primary Examiner

U.S. Cl. X.R.

23—149, 165, 182, 183, 186, 200; 106—300; 137—1